United States Patent [19]
Nachbur et al.

[11] 3,878,245
[45] Apr. 15, 1975

[54] PROCESS FOR THE MANUFACTURE OF PHOSPHORUS-CONTAINING CONDENSATION PRODUCTS, THE PRODUCTS AND THEIR USE AS FLAMEPROOFING AGENTS

[75] Inventors: Hermann Nachbur, Dornach; Arthur Maeder, Therwil, both of Switzerland

[73] Assignee: Ciba-Geigy AG, Basel, Switzerland

[22] Filed: Aug. 31, 1972

[21] Appl. No.: 285,295

[30] Foreign Application Priority Data
Sept. 10, 1971 Switzerland................ 13305/71

[52] U.S. Cl................ 260/553 R; 117/137; 252/8.1; 260/2 P
[51] Int. Cl.......................................... C07c 127/00
[58] Field of Search.............. 260/555 R, 553 R, 2 P

[56] References Cited
UNITED STATES PATENTS

| | | | |
|---|---|---|---|
| 2,809,941 | 10/1957 | Reeves et al. | 260/2 P |
| 2,812,311 | 11/1957 | Reeves et al. | 260/2 P |
| 2,983,623 | 5/1961 | Coates et al. | 260/2 P X |

OTHER PUBLICATIONS
Reeves et al., Textile Chemist and Colorist, Vol. 2, No. 16, pp. 283–285, (Aug. 12, 1970).

*Primary Examiner*—Bernard Helfin
*Assistant Examiner*—Gerald A. Schwartz
*Attorney, Agent, or Firm*—Joseph G. Kolodny; Prabodh I. Almaula; Edward McC. Roberts

[57] ABSTRACT

The subject of the invention is a process for the manufacture of water-soluble condensation products of hydroxymethyl-phosphonium compounds, characterised in that (a) 1 mol of a tetrakis-(hydroxymethyl)-phosphonium compound is condensed with (b) 0.02 to 0.2 mol, preferably 0.05 to 0.15 mol, of urea at 40° to 120°C and optionally in the presence of an inert organic solvent and if appropriate free hydroxyl groups are at least partially etherified with at least one alkanol with 1 to 4 carbon atoms and if appropriate the salts of the condensation products are converted into the corresponding hydroxides.

The condensation products are used for flameproofing organic fibre material, especially textiles.

8 Claims, No Drawings

PROCESS FOR THE MANUFACTURE OF PHOSPHORUS-CONTAINING CONDENSATION PRODUCTS, THE PRODUCTS AND THEIR USE AS FLAMEPROOFING AGENTS

The subject of the invention is a process for the manufacture of water-soluble condensation products of hydroxymethyl-phosphonium compounds, characterised in that (a) 1 mol of a tetrakis-(hydroxymethyl)-phosphonium compound is condensed with (b) 0.02 to 0.2 mol, preferably 0.05 to 0.15 mol, of urea at 40° to 120°C and optionally in the presence of an inert organic solvent and if appropriate free hydroxyl groups are at least partially etherified with at least one alkanol with 1 to 4 carbon atoms and if appropriate the salts of the condensation products are converted into the corresponding hydroxides.

The condensation is preferably carried out at 70° to 110°C in an aqueous medium. It is however also possible to work in an inert organic solvent or solvent mixture. For this, aromatic hydrocarbons are above all suitable, such as, for example, toluene, benzene or a mixture thereof.

At the same time it is however also possible to carry out the condensation in the absence of an inert organic solvent, for example if condensation product already manufactured is used as the solvent or if condensation is carried out in the melt.

An appropriate procedure is to heat the tetrakis-(hydroxymethyl)-phosphonium compound, which as a rule is present as an aqueous solution, to the boil together with the component (b), optionally in a solvent, and to distil off the water. Possible tetrakis-(hydroxymethyl)-phosphonium compounds are above all the salts and the hydroxide.

Suitable tetrakis-(hydroxymethyl)-phosphonium salts are, for example, the formate, acetate, phosphate or sulphate and the halides, such as, for example, the bromide or especially the chloride. Tetrakis-(hydroxymethyl)-phosphonium chloride is hereafter referred to as THPC.

Where tetrakis-(hydroxymethyl)-phosphonium hydroxide (THPOH) is used as the starting product, it is appropriately prepared beforehand from a corresponding salt, for example THPC, by neutralisation in aqueous solution with a base, for example sodium hydroxide, and subsequent dehydration.

The etherification, which may have to be carried out, of the condensation product which still contains free hydroxyl groups is effected, for example, with n-butanol, n-propanol, ethanol or especially methanol. Preferably, the reaction is carried out in an acid medium.

The acid catalysts optionally used conjointly in the condensation are preferably salts which have an acid action (LEWIS acids), such as magnesium chloride, iron-III chloride, zinc nitrate or boron trifluoride/-diethyl ether. The conjoint use of these catalysts is especially advisable in the condensation of THPOH.

After completion of the condensation and optional etherification, the salts of the condensation products can also be completely or partially converted into their corresponding hydroxides, which is as a rule effected by adding strong bases such as alkali metal hydroxides or alkaline earth metal hydroxides, for example sodium hydroxide, potassium hydroxide or calcium hydroxide, or also sodium carbonate. The amount of base is appropriately so chosen that the pH value of the reaction mixture is about 5 to 8. Appropriately, this conversion is carried out in the bath used for application.

At times, the end products show an unpleasant odour caused by volatile, low molecular trivalent phosphorus compounds, for example phosphines, such as trihydroxymethylphosphine. This odour can be eliminated by an oxidative after-treatment of the condensation product, for example by passing air or oxygen into the reaction mixture or by adding oxidising agent such as hydrogen peroxide or potassium persulphate.

The condensation products are used for flameproofing organic fibre material, especially textiles. For this, an appropriate procedure is to apply to these materials an aqueous preparation which contains at least 1) a condensation product of the indicated type and 2) a polyfunctional compound which differs from the products according to 1), and to finish the materials treated in this way by the moist batch, wet batch, especially ammonia or, preferably, thermofixing process.

The component 2) is preferably a polyfunctional epoxide or above all a polyfunctional nitrogen compound. Possible epoxides are above all epoxides which are liquid at room temperature and have at least two epoxide groups, which are preferably derived from polyhydric phenols. Polyfunctional nitrogen compounds are, for example, polyalkylenepolyamines or especially compounds which form aminoplasts, or aminoplast precondensates. The latter are preferred.

By compounds which form aminoplasts there are understood nitrogen compounds which can be methylolated and by aminoplast precondensates there are understood addition products of formaldehyde to nitrogen compounds which can be methylolated. As compounds which form aminoplasts or as nitrogen compounds which can be methylolated, there may be mentioned:

1,3,5-aminotriazines such as N-substituted melamines, for example N-butylmelamine, N-trihalogenomethylmelamines, triazones and ammeline, guanamines, for example benzoguanamines and acetoguanamines or also diguanamines.

Further possibilities are: cyanamide, acrylamide, alkylurea or arylurea and alkylthioureas or arylthioureas, alkyleneureas or alkylenediureas, for example, urea, thiourea, urones ethyleneurea, propyleneurea, acetylenediurea or especially 4,5-dihydroxyimidazolidone-2 and derivatives thereof, for example 4,5-dihydroxyimidazolidone-2 substituted in the 4-position, at the hydroxyl group, by the radical —CH$_2$CH$_2$CO—NH—CH$_2$OH. The methylol compounds of a urea, of an ethyleneurea or, especially, of melamine are preferentially used. Valuable products are in general given by products which are as highly methylolated as possible but in particular also by products with low methylolation, for example methylolmelamines which may or may not be etherified such as dimethylolmelamine or trimethylolmelamine or its corresponding ethers. Suitable aminoplast precondensates are both predominantly monomolecular aminoplasts and also more highly precondensed aminoplasts.

The ethers of these aminoplast precondensates can also be used together with the reaction products. For example, the ethers of alkanols such as methanol, ethanol, n-propanol isopropanol, n-butanol or pentanols are advantageous. It is, however, desirable that these aminoplast precondensates should be water-soluble, such as, for example, pentamethylolmelaminedimethyl-ether or trimethylolmelamine-dimethyl-ether.

The organic fibre materials which are to be provided with a flameproof finish are, for example, wood, paper, furs, hides or preferably textiles. In particular, fibre materials of polyamides, cellulose, cellulose-polyester of polyester are flameproofed, fabrics of wool or polyester, or mixed fabrics of polyester and cellulose, wherein the ratio of the polyester constituent to the cellulose constituent is 1:4 to 2:1, being preferred. It is thus possible to use, for example, so-called 20/80, 26/74, 50/50 or 67/33 polyester and cellulose mixed fabrics.

The cellulose or cellulose constituent of the fibre material originates, for example, from linen, cotton, rayon or staple viscose. In addition to polyester-cellulose fibre mixtures, fibre mixtures of cellulose with natural or synthetic polyamides can also be used. Above all wool fibre materials can be flameproofed well with the condensation products.

The aqueous preparations for flameproofing the organic fibre materials as a rule contain 200 to 600 g/l, preferably 350 to 450 g/l, of the component (1) and 20 to 200 g/l, preferably 40 to 120 g/l, of the component (2). The preparations in most cases have an acid to neutral or weakly alkaline pH value.

The preparations for flameproofing can optionally contain yet further additives. To achieve a greater deposit of substance on fabrics it is advantageous, for example, to add 0.1 to 0.5%o of a high molecular polyethylene glycol. Furthermore, the customary plasticisers can be added to the preparations, for example an aqueous polyethylene emulsion or silicone oil emulsion.

To improve the mechanical strength of the fibres it is also possible to add to the preparations suitable copolymers, for example copolymers of N-methylolacrylamide or cationic copolymers. Advantageous compositions for this purpose are, for example, aqueous emulsions of copolymers of a) 0.25 to 10% of an alkaline earth metal salt of an $\alpha,\beta$-ethylenically unsaturated monocarboxylic acid, b) 0.25 to 30% of a N-methylolamide or N-methylolamide-ether of an $\alpha,\beta$-ethylenically unsaturated monocarboxylic or dicarboxylic acid and c) 99.5 to 60% of at least one other copolymerisable compound.

These copolymers and their manufacture are known. The tear strength and abrasion resistance of the treated fibre material can be favourably influenced by the conjoint use of such a copolymer.

If a polymer of the indicated type is also added to the preparation, it is advantageously added in small amounts, for example 1 to 10% relative to the amount of the condensation product. The same is true of any plasticiser which may be added, where the appropriate amounts can again be 1 to 10%.

It is also possible to add curing catalysts, such as, for example, ammonium chloride, ammonium dihydrogen orthophosphate, phosphoric acid, magnesium chloride or zinc nitrate, but is in most cases not necessary.

The pH value of the preparations is as a rule 2 to 7.5, preferably 4 to 7, and is adjusted in the usual manner by adding bases or acids.

It can also be advantageous to add buffer substances, for example $NaHCO_3$, disodium and trisodium phosphate or triethanolamine.

To improve the durability of the flameproof finishes and to achieve a soft handle it can be advantageous to add, to the aqueous preparations, halogenated paraffins in combination with a polyvinyl halide compound.

The preparations are now applied to the fibre materials, which can be done in a manner which is in itself known. Preferably, piece goods are used, and are impregnated on a padder which is fed with the preparation at room temperature.

In the preferred thermofixing process, the fibre material impregnated in this way must now be dried and subjected to a heat treatment. Drying is appropriately carried out at temperatures of up to 100°C. Thereafter the material is subjected to a heat treatment at temperatures above 100°C, for example 100° to 200°C, preferably 120° to 180°C, the duration of which can be the shorter the higher is the temperature. This duration of heating is, for example, 30 seconds to 10 minutes.

It is, however, also possible to use the so-called ammonia fixing process or moist fixing process or the wet fixing process.

If the moist fixing process is used, the fabric is first dried to a residual moisture of about 5 to 20% and is thereafter stored for 12 to 48 hours at about 40° to 60°C, rinsed, washed and dried. In the wet fixing process a similar procedure is followed, except that the completely wet fibre material is stored. In the ammonia fixing process, the treated fibre material is gas-treated whilst still moist, preferably rinsed in an ammonia solution, and is subsequently dried.

A rinse with an acid-binding agent, preferably with aqueous sodium carbonate solution, can be appropriate in the case of a strongly acid reaction medium.

In the examples which follow, the percentages and parts are percentages by weight and parts by weight, respectively. The relationship of parts by volume to parts by weight is as of ml to g.

EXAMPLE 1

244 parts of a 78% strength aqueous solution of THPC (1 mol) and 7.5 parts of urea (0.125 mol) are treated for 2 hours at 100° - 110°C internal temperature in a stirred vessel of 500 parts by volume capacity which is equipped with a thermometer and reflux condenser.

The reaction product is in the form of a clear solution which contains 77% of condensation product. The infra-red spectrum of this product shows the following bands:

| Broad | band at approx. | 3,240 | $cm^{-1}$ | strong |
|---|---|---|---|---|
| Sharp | " | 2,910 | " | weak |
| Broad shoulder | " | 2,850 | " | medium-strong |
| Broad | " | 2,610 | " | medium-strong |
| Broad shoulder | " | 2,450 | " | weak |
| Broad shoulder | " | 2,350 | " | weak |
| Sharp | " | 2,070 | " | medium |
| Broad | " | 1,650 | " | medium-strong |
| Broad | " | 1,550 | " | medium |
| Broad | " | 1,410 | " | medium |
| Sharp | " | 1,295 | " | weak |
| Broad | " | 1,260 | " | weak |
| Broad | " | 1,190 | " | medium-weak |
| Broad shoulder | " | 1,100 | " | weak |
| Sharp | " | 1,035 | " | strong |
| Sharp shoulder | " | 910 | " | medium-strong |
| Broad shoulder | " | 880 | " | medium |

EXAMPLE 2

170.5 parts (1 mol) of crystalline anhydrous THPC and 7.5 parts of urea (0.125 mol) are condensed for 2 hours in the melt, at 100°–120°C internal temperature, in a stirred vessel of 500 parts by volume capacity which is equipped with a thermometer and reflux condenser. After cooling, 195 parts of a white, pasty condensation product are obtained.

The infra-red spectrum of this product shows the following bands:

| | | | | |
|---|---|---|---|---|
| Broad | band at approx. | 3,240 | cm⁻¹ | strong |
| Sharp | " | 2,920 | " | weak |
| Broad shoulder | " | 3,850 | " | medium-strong |
| Broad | " | 2,620 | " | medium |
| Broad shoulder | " | 3,460 | " | weak |
| Broad shoulder | " | 2,350 | " | weak |
| Sharp | " | 2,070 | " | weak-medium |
| Broad | " | 1,640 | " | medium-strong |
| Broad | " | 1,550 | " | medium-weak |
| Broad | " | 1,410 | " | medium |
| Sharp | " | 1,300 | " | weak |
| Sharp | " | 1,260 | " | weak |
| Broad | " | 1,195 | " | weak-medium |
| Sharp | " | 1,040 | " | strong |
| Sharp shoulder | " | 920 | " | medium |
| Broad | " | 880 | " | medium-weak |

EXAMPLE 3

488 parts of a 78% strength aqueous THPC solution (2 mols), 2.4 parts of urea (0.04 mol) and 400 parts of toluene are heated to the boil, with rapid stirring, in a stirred vessel of 1,000 parts by volume capacity which is equipped with a water separator and thermometer. The azeotropic removal of the water from the aqueous THPC solution, and of the water formed by the condensation (a total of 108.5 parts of water) starts at a boiling point of 91°C. After removing this amount of water, the boiling point is 107°C without, however, further water being formed. The mixture is cooled to 90°C, the product is dissolved by adding 200 parts of water and the toluene is largely siphoned off. The aqueous solution is completely evaporated in vacuo at 70°C.

384 parts of a reddish, partly crystalline condensation product are obtained.

The infra-red spectrum of this product shows the following bands:

| | | | | |
|---|---|---|---|---|
| Broad | band at approx. | 3,240 | cm⁻¹ | strong |
| Sharp | " | 2,920 | " | weak |
| Broad shoulder | " | 3,240 | " | medium |
| Broad | " | 3,620 | " | medium |
| Broad shoulder | " | 2,470 | " | weak |
| Broad shoulder | " | 2,350 | " | weak |
| Sharp | " | 2,070 | " | weak-medium |
| Broad | " | 1,630 | " | medium-strong |
| Broad | " | 1,550 | " | weak |
| Broad | " | 1,410 | " | medium |
| Sharp | " | 1,395 | " | weak |
| Broad | " | 1,195 | " | weak |
| Sharp | " | 1,040 | " | strong |
| Sharp shoulder | " | 930 | " | medium |
| Broad shoulder | " | 375 | " | weak-medium |

EXAMPLE 4

244 parts of a 78% strength aqueous solution of THPC (1 mol) are neutralised to a pH-value of 7.2 with 59 parts of 30% strength aqueous sodium hydroxide solution, in a stirred vessel of 500 parts by volume capacity which is equipped with a thermometer and reflux condenser, and thereafter 12 parts (0.2 mol) of urea are added. The mixture is then condensed for 2 hours at 100°–105°C internal temperature. Thereafter the water is removed in vacuo at 60°C.

184 parts of a viscous, condensation product containing 25.5 parts of NaCl are obtained.

The infra-red spectrum of this product shows the following bands:

| | | | | |
|---|---|---|---|---|
| Broad | band at approx. | 3,240 | cm⁻¹ | strong |
| Sharp | " | 2,910 | " | weak |
| Broad shoulder | " | 2,850 | " | medium |
| Broad | " | 2,630 | " | medium |
| Broad shoulder | " | 2,350 | " | weak |
| Sharp | " | 2,080 | " | weak-medium |
| Broad | " | 1,600 | " | strong-medium |
| Broad | " | 1,500 | " | weak-medium |
| Broad | " | 1,400 | " | weak-medium |
| Sharp | " | 1,390 | " | weak |
| Broad | " | 1,150 | " | weak |
| Broad | " | 1,040 | " | medium |
| Broad | " | 390 | " | medium |
| Broad shoulder | " | 740 | " | weak |

EXAMPLE 5

192 parts of the condensation product obtained in Example 3 are dissolved in 80 parts of methanol in a stirred vessel of 500 parts by volume capacity which is equipped with a reflux condenser and thermometer, 0.1 part of concentrated aqueous HCl is added and the mixture is etherified for 30 minutes at the reflux temperature (65°–66°C). The excess methanol is subsequently removed in vacuo at 50°C.

219 parts of a reddish-coloured pasty product are obtained.

The infra-red spectrum of this product shows the following bands:

| | | | | |
|---|---|---|---|---|
| Broad | band at approx. | 3,240 | cm⁻¹ | strong |
| Sharp | " | 2,920 | " | weak |
| Broad shoulder | " | 2,850 | " | medium |
| Broad shoulder | " | 2,620 | " | weak-medium |
| Broad shoulder | " | 2,350 | " | weak |
| Sharp | " | 2,070 | " | weak |
| Broad | " | 1,630 | " | medium |
| Broad | " | 1,540 | " | weak |
| Broad | " | 1,410 | " | medium |
| Sharp | " | 1,395 | " | weak |
| Broad | " | 1,190 | " | weak |
| Sharp | " | 1,040 | " | strong |
| Sharp shoulder | " | 915 | " | medium |
| Broad shoulder | " | 830 | " | weak-medium |

EXAMPLE 6

Mixed fabrics of polyester/cotton (PES/CO), 67/33, are padded with the liquors according to Table 1 below, dried at 80° to 100°C and subsequently cured for 5 minutes at 150°C.

The fabric is then washed for 5 minutes at 60°C in a liquor which per litre contains 5 ml of hydrogen peroxide (35% strength), 3 g of sodium hydroxide solution (30% strength) and 1 g of a 25% strength aqueous solution of a condensation product of 1 mol of p-tert.-nonylphenol and 9 mols of ethylene oxide. Thereafter the fabric is rinsed and dried. The degree of fixing indicates the amount of product present on the fibre material after rinsing (relative to the amount originally taken up).

The fabric is then washed up to 40 times for 45 minutes at 60°C in a domestic washing machine, in a liquor which contains 4 g/l of a domestic detergent (SNV 158,861 wash).

The individual fabric samples are then tested for their flameproof character (DIN 53,906 vertical test; ignition time 6 seconds).

The results are summarised in Table 1 below.

and 1 g of a 25% strength aqueous solution of a condensation product of 1 mol of p-tert.-nonylphenol and 9 mols of ethylene oxide. Thereafter it is rinsed and dried.

The polyester-cotton fabric and the cotton fabric are respectively washed for 5 minutes at 60°C and 5 minutes at 95°C with a liquor which per litre contains 5 ml of hydrogen peroxide (35% strength), 3 g of sodium hydroxide solution (30% strength) and 1 g of a 25% strength aqueous solution of a condensation product of Table 1

| Constituents (g/l) | untreated | Treated with Liquor A |
|---|---|---|
| Product according to Example 1 | | 715 |
| Dimethylolmelamine | | 96.5 |
| pH-Value of the Liquor (adjusted with NaOH) | | 5.5 |
| Liquor uptake (%) | | 75 |
| Degree of Fixing (%) | | 54 |
| Flameproof Character | | Smouldering time (seconds)/tear length (cm) |
| After rinsing | burns | 0/12 |
| After 20 washes (60°C) | burns | 0/12 |
| After 40 washes (60°C) | burns | 3/10 |

EXAMPLE 7

Fabrics of polyester/cotton (PES/CO), 67:33 and 50:50, cotton serge (CO) and wool gabardine (W) are padded with the liquors of Table 2 which follows, dried at 80 to 100°C and subsequently cured for 5 minutes at 150°C. (Thermofixing process). Apart from the thermofixing process, the ammonia fixing process can also be used. The padded fabric is dried (not completely) at 80°C, gassed for 5 minutes with ammonia, then padded in a liquor which contains 300 ml of a 24% strength aqueous ammonia solution per litre and, after a dwell time of 5 minutes in air, dried at about 80°C.

The wool fabric is washed for 5 minutes at 40°C in a liquor which per litre contains 4 g of sodium carbonate and 1 g of a 25% strength aqueous solution of a condensation product of 1 mol of p-tert.-nonylphenol and 9 mols of ethylene oxide. Thereafter the fabric is rinsed and dried.

The fabrics are then washed up to 20 times for 45 minutes, at temperatures of 40°C, 60°C or 95°C, in a domestic washing machine, using a liquor which contains 4 g/l of a domestic detergent (SNV 198,861 wash).

The individual fabrics are then tested for their flameproof character (DIN 53,906 vertical test; ignition time 6 seconds). Untreated fabrics burn away.

The degree of fixing indicates the amount of the flameproofing agent after rinsing, as a percentage of the original uptake.

The results are summarised in Table 2 below.

Table 2

| Constituents, g/l | Treated with | | | | | | | | | | | |
|---|---|---|---|---|---|---|---|---|---|---|---|---|
| | PES/CO 50:50 | | | | | PES/CO 67:33 | | | | W | | CO |
| | | T | | | A | | T | | | A | T | T |
| | I | II | III | IV | V | VI | VII | VIII | IX | X | XI | XII |
| Product according to Example | | | | | | | | | | | | |
| 5 | 580 | | | | | 580 | | | | | 480 | |
| 4 | | 485 | | | | | 485 | | | | | |
| 3 | | | 510 | | 510 | | | 510 | 510 | | | |
| 2 | | | | 515 | | | | | 515 | | | 275 |
| Di-Trimethylolmelamine | 103 | | 103 | 103 | 103 | 103 | | 103 | 103 | 103 | 84.5 | 120 |
| Trimethylolmelamine-dimethyl-ether (75% strength) | | 153 | | | | | 153 | | | | | |
| Condensation Product * | | | | | | | | | | | 2 | |
| Silicon oil emulsion (40% strength) | 35 | 35 | 35 | 35 | 35 | 35 | 35 | 35 | 35 | 35 | 35 | 35 |
| pH-Value | 4.5 | 5.5 | 4.5 | 7** | 4.5 | 4.5 | 5.5 | 4.5 | 7** | 4.5 | 4.5 | 5.5 |
| Degree of Fixing, % | 47 | 60 | 54 | 60 | — | 46 | 61 | 52 | 61 | — | 39 | 56 |
| Liquor Uptake, % | 70 | 70 | 70 | 70 | 70 | 70 | 70 | 70 | 70 | 70 | 80 | 80 |
| Flameproof Character: burning time (seconds)/tear length (cm) | | | | | | | | | | | | |
| | I | II | III | IV | V | VI | VII | VIII | IX | X | XI | XII |
| After rinsing | 0/9 | 0/9 | 0/6 | 0/8 | 0/7 | 0/11 | 0/10 | 0/9 | 0/9 | 0/9 | 0/5.5 | 0/6 |
| After 1 wash | 0/8.5 | 0/8 | 0/7 | 0/7 | 0/5 | 0/9.5 | 0/9 | 0/11 | 0/10 | 0/8 | 0/5 | 0/6 |
| After 5 washes | 0/12 | 0/8 | 0/7 | 0/8.5 | 0/4 | 0/10.5 | 0/9.5 | 0/10 | 0/8.5 | 0/7.5 | 0/4 | 0/7.5 |
| After 20 washes | — | 0/11 | 0/13 | 0/7 | 0/4 | — | 0/8.5 | 0/13 | 0/11 | 0/10.5 | 0/5 | 7 |

\* Condensation product of 1 mol of p-tert.-nonylphenol and 4 mols of ethylene oxide
\*\* Product converted into hydroxyl compound
T = thermofixing process
A = ammonia fixing process

We claim:

1. Process for the manufacture of water-soluble condensation products from tetrakis-(hydroxymethyl)-phosphonium compounds and urea, comprising in that 1 mole of a tetrakis-(hydroxymethyl)-phosphonium hydroxide or salt selected from the group consisting of formate, acetate, phosphate, sulphate and halide, is condensed with 0.02 to 0.2 mole of urea at 40° to 120°C, in the presence of an aqueous medium or organic solvent or in the melt.

2. Process according to claim 1, wherein the condensation is carried out in the presence of at least one inert aromatic hydrocarbon as the solvent.

3. Process according to claim 1, wherein the two starting materials are condensed with one another in a molar ratio of 1:0.05 to 1:0.15.

4. Process according to claim 1, wherein a tetrakis-(hydroxymethyl)-phosphonium salt, selected from the group consisting of formate, acetate, phosphate, sulphate and chloride is used.

5. Process according to claim 1, whrein tetrakis-(hydroxymethyl)-phosphonium halide is used.

6. Process according to claim 1, wherein tetrakis-(hydroxymethyl)-phosphhonium chloride is used.

7. The condensation products obtained according to the process of claim 1.

8. Process according to claim 1, wherein the condensation product is reacted with an alkanol of 1 to 4 carbon atoms in an acid medium at reflux temperatures to partially or completely etherify the free hydroxyl group of the condensation product.

* * * * *